July 13, 1943. S. J. CROZIER 2,324,196
SAW HORSE
Filed July 5, 1941 2 Sheets-Sheet 1

INVENTOR.
SCOTT J. CROZIER
BY Oberlin, Limbach & Day
ATTORNEYS.

July 13, 1943.  S. J. CROZIER  2,324,196
SAW HORSE
Filed July 5, 1941  2 Sheets-Sheet 2

INVENTOR.
SCOTT J. CROZIER
BY Oberlin, Limbach + Day
ATTORNEYS.

Patented July 13, 1943

2,324,196

UNITED STATES PATENT OFFICE 2,324,196

SAWHORSE

Scott J. Crozier, Cleveland Heights, Ohio

Application July 5, 1941, Serial No. 401,155

4 Claims. (Cl. 304—5)

This invention relates as indicated to saw horses or trestles and is concerned particularly with the provision of a prefabricated metallic frame by which the necessary connections between the legs and working platform of the trestle is provided.

As is well known, building contractors in the erection and repair of any structure usually require at least one and usually many of these saw horses or trestles on which the building materials are supported during work thereon by the carpenters and other workmen. It is the present practice to build a new set of saw horses for each job. This practice is due to the fact that when the saw horses are fabricated by nailing together wooden pieces, the length of their life is usually not more than the term of their use on a single job. An equal and perhaps more important reason why saw horses are not moved from job to job is on account of their cumbersome and space-consuming nature. Usually if an effort is made to transport them from job to job, they are so loosened and otherwise deteriorated during packing in the transportation vehicle and in moving that they become virtually worthless after being transported.

It is a principal object of my invention to provide a saw horse or a trestle which includes a prefabricated metallic frame adapted to support a wood working platform and wood legs so that this prefabricated metallic frame provides the required connection between the legs and platform, so that a more rigid and thus more satisfactory structure is provided than when it is formed entirely of wood elements nailed together in the usual form. The renewable or replaceable wood legs and platform provide a "knock-down" construction which permits packing the entire trestle into a more compact space for shipment or transportation from place to place, and moreover permits renewal and replacement of those parts which are most subject to wear and breakage.

It is a further object of my invention to provide a frame as aforesaid which is in a measure collapsable so that not only the entire structure occupies less space during transportation thereof from job to job, but such feature permits of a certain amount of desirable adjustment in the height as well as leg spread of the saw horse.

Other objects of my invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Referring now more specifically to the drawings and more especially to Figures 1 and 5 to 7, the saw horse or trestle here illustrated, as one embodiment of my invention, comprises two A-frames 1 and 2 interconnected by means of a platform supporting trough 3 and a tray generally indicated at 4.

The platform support 3 is adapted to receive a wood insert such as a 2" x 4" of 2" x 6", and the legs of the A-frames 1 and 2 are adapted to receive wood inserts which may be of any suitable size such as a 1" x 2" or a 2" x 4" for example. The wood platform insert has been omitted from the illustration in the interests of clarity in illustrating the prefabricated metallic frame which is the principal feature of the present invention.

Figure 2:
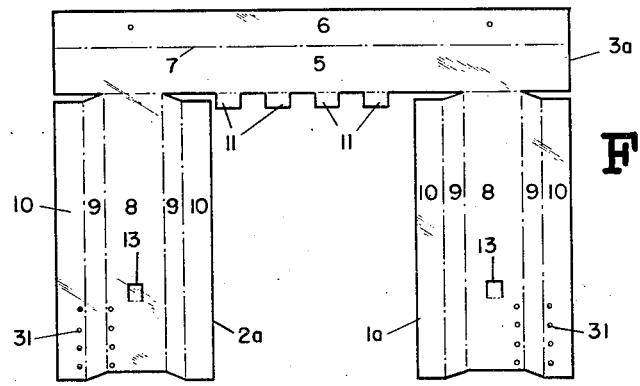
Fig. 2 is a developed plan view of the metal stamping from which may be folded up one-half of the metallic framework portion of Fig. 1.
Figure 9:
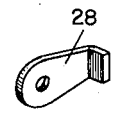
Fig. 9 is a perspective view of the latch which is employed, as illustrated in Fig. 1, for the purpose of maintaining the legs of the A-frames in a selected position.

The legs of the 2 A frames and the platform support 3 may be conveniently formed from two complementary metallic stampings one of which is illustrated in Fig. 2.

By having reference to Fig. 2, it will be observed that such stampings comprise a portion 3a which is divided into two parts 5 and 6 separated by a bent line 7. Attached to the portion 3a are spaced extensions 1a and 2a, each of these comprising a central portion 8 and unitary lateral extensions 9 and 10 separated from the central portion 8 and from each other by suitable fold lines indicated by dot-dash lines.

The lower edge of the portions 5 of each of the complementary stampings, of which one is illustrated in Fig. 2, are provided with complementary projections 11. When the parts are formed and assembled, these complementary projections alternately encircle a hinge pin 12 most clearly illustrated in Fig. 7.

The central portion 8 of each of the complementary stampings, one of which is illustrated in Fig. 2, are provided with struck-up portions 13, the function of which will be more specifically explained later.

Figure 3:
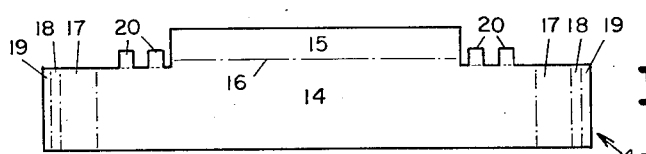
Fig. 3 is a developed plan view of a stamping from which may be folded up one of the cross members which form the cross piece and one of the connections between the legs of the A-frames shown in Fig. 1.
Figure 4:
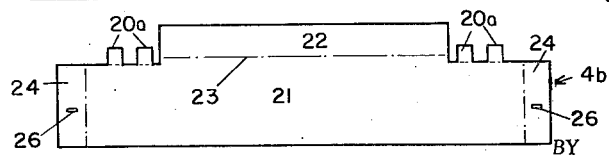
Fig. 4 is a developed plan view of the stamping from which the other of such connecting members may be folded up.
Figure 5:
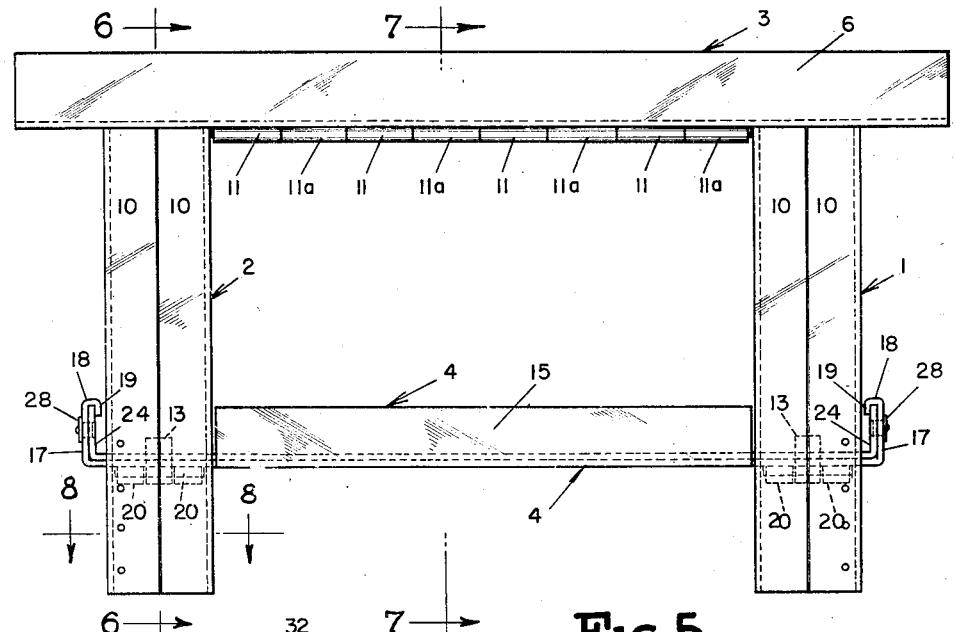
Fig. 5 is a side elevational view of the metallic framework portion of the structure illustrated in Fig. 1.

The tray 4 is, as previously illustrated, formed of two stampings which are illustrated in Figures 3 and 4. The stamping 4a illustrated in Fig. 3 consists of a central portion 14 provided with a unitary projection 15 along one lateral edge and separated therefrom by a bend line 16. It is also terminally provided on opposite ends with unitary projections 17, 18, and 19 separated from each other and from the central portion 14 by appropriate fold or bend lines as illustrated. Spaced ears 20 are likewise provided on one side by the portion 14.

The other stamping 4b, comprising one of the elements of the tray 4, comprises a central portion 21 which is provided with a unitary projection 22 along one side thereof and separated therefrom by a bend line 23. Unitary terminal projections 24 extend from opposite ends of the central portion 21 and are separated therefrom by bend lines as illustrated and each of such projections is provided with a slot or opening 26 for the purpose hereinafter more fully explained.

The following is a description of the manner in which the complementary elements, of which one is illustrated in Fig. 2, may be bent to provide out-side assembly including one-half of the trough 3 and one each of the two pairs of legs of the A-frames. The element 6 is bent upwardly and at right angles to element 5. Elements 9 are bent upwardly and at right angles to element 6. Elements 10 are bent inwardly and at right angles to elements 9. The tabs or ears 11 are circularized as are the struck-up portions or tabs 13.

Figure 1:
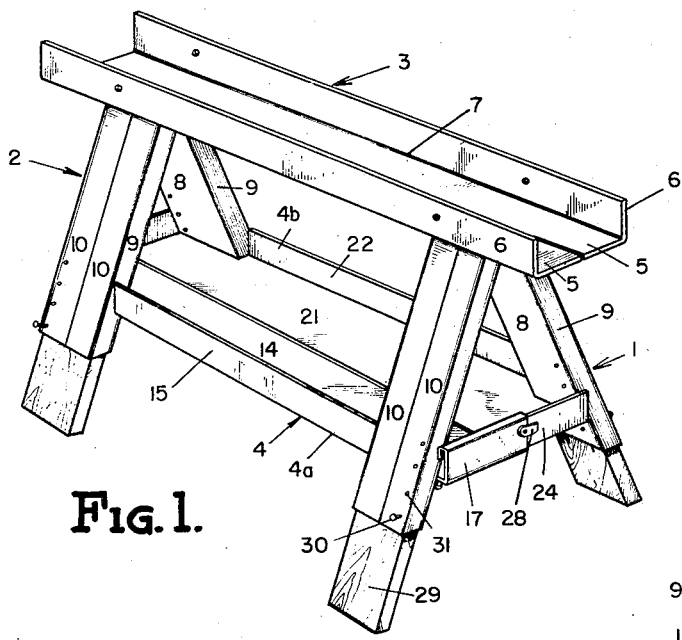
Fig. 1 is a perspective view of a saw horse constructed in accordance with the principles of my invention.
Figure 8:
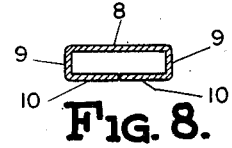
Fig. 8 is a transverse sectional view of one of the legs of the frame illustrated in Fig. 5 taken on a plane substantially indicated by the line 8—8.

Bending of the elements 6 with respect to element 5 forms one side of the trough 3 as illustrated in Fig. 1. Rebending the portions 8, 9, and 10 in the manner described provides hollow legs of rectangular cross section as illustrated in Fig. 8. Each of these legs on its inner face is provided with the circularized projection 13. The circularized projections 11 are arranged alternately with respect to the circularized projections 11a of the complementary stamping and by inserting a hinge pin 12 therethrough, the parts are pivotally connected in the manner most clearly illustrated in Fig. 7. The next step is to form the stampings of Figures 3 and 4 as follows:

First, with respect to Fig. 3, the element 15 is bent upwardly and at right angles to the portion 14. The portions 17 are bent upwardly and at right angles to the portion 14. The portion 18 is bent inwardly and at right angles to portions 17, and the portions 19 are bent downwardly and at right angles to the portion 18. The tabs or projections 20 are circularized.

Now, referring to Fig. 4, the portion 22 is bent upwardly and at right angles to the portion 21. The terminal tabs 24 are bent upwardly and at right angles to the portion 21. Tabs portion 20a are circularized.

The element 4a is placed adjacent to the previously fabricated leg and trough portions as illustrated in Fig. 1, so that the circularized tabs 20 straddle the circularized tabs 13 on the inner faces of the legs. Hinge pins 27 are then inserted pivotly connecting the element 4a to the inner face of the legs.

The element 4b is assembled on to element 4a in such a manner that the projections 24 on the ends of the element 4b are telescopically engaged in the channels formed by the rebent portions 17, 18, and 19 of the element 4a. The circularized tabs 20a are then arranged to straddle the circularized tabs 13 on the inner faces of the adjacent legs and hinge pins 27 inserted pivotly connecting the last element of the assembly. It will be observed that the telescopic engagement between the two sections 4a and 4b of the tray 4 along with the pivotal connection between the two sections of the trough tray permits the legs of each A-frame to be adjustably moved apart and toward each other. A latch 28 pivotly attached to the element 4a and adapted to enter the opening 26 in the element 4b is effective for the purpose of locking the two elements 4a and 4b against relative movement, thus locking the A-frames and accordingly the entire trestle in rigid position. It is within the contemplation of my invention to provide a series of spaced openings 26 in each projection 24 and thus the latch 28 may secure the legs of the A-frames in any one of a plurality of selected relative positions.

The trestle frame, fabricated in the manner just described, may be employed as such but preferably wooden inserts such as 29 will be placed in each of the hollow legs and by placing pins or nails 30 in a selected one of the openings 31, the height of the trestle may be quickly and conveniently adjusted.

Figure 6:
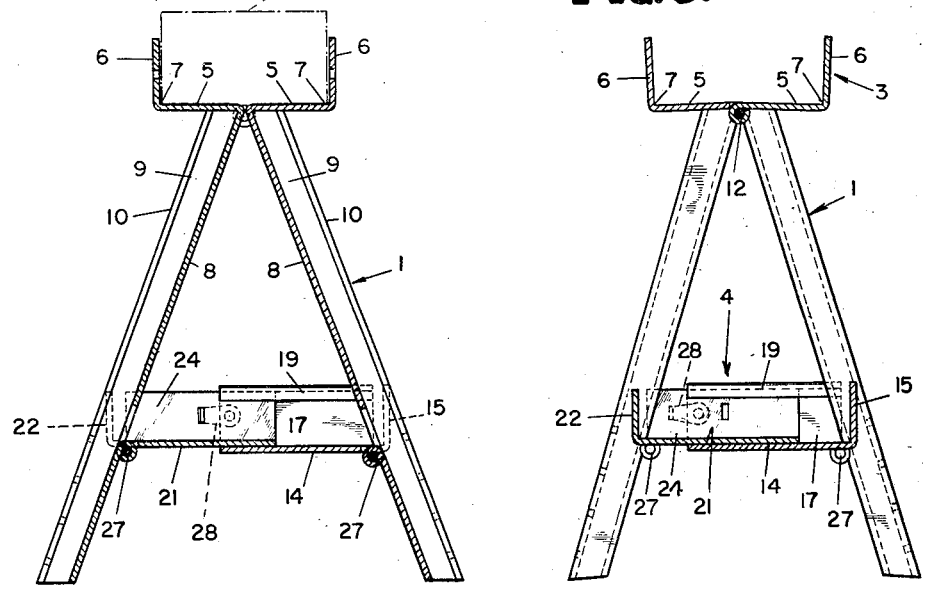
Fig. 6 is a transverse sectional view of the structure illustrated in Fig. 5 taken on a plane substantially indicated by the line 6—6.
Figure 7:
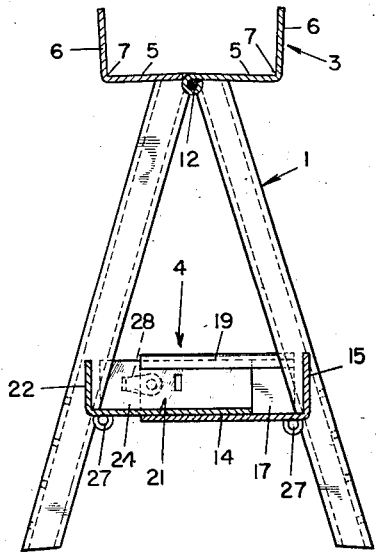
Fig. 7 is a transverse sectional view of the structure illustrated in Fig. 5 taken on a plane substantially indicated by the line 7—7.

As previously indicated, there will also preferably be inserted in the trough 3 a wooden platform indicated by dotted lines at 32 in Fig. 6.

When the saw horse or trestle is assembled for use, the tray 4 serves as a means for supporting tools as well as odd pieces of building material. When the trestle is disassembled for transportation from one point to another, the tray 4 serves as a means for supporting the wooden leg inserts 29 as well as the platform 39 so that the various pieces of the assembly are in a unitary group for transportation.

When the sheet metal members are rebent for fabrication in accordance with the particulars previously given, the various open seams formed may, if desired, be closed as by soldering or other expedients well known to those familiar with the art of sheet metal fabrication.

From the foregoing description, it will be observed that I have provided a structure which is not only capable of easy and economic manufacture, but which also, when fabricated, produces a structure which is extremely rigid although as light or lighter than if made of wooden parts as is the customary practice today. The tray 4 serves as a rigid connection between all of the legs of the trestle both in the extended as well as collapsed position. Thus the trestle is extremely strong and rigid during use and is sufficiently strong in its collapsed condition so that a number of trestles may be piled one on top of the other for transport without damage to them.

Other modes of applying the principle of the invention may be employed, change being made as regards the details described, provided the features stated in any of the following claims or the equivalent of such be employed.

I therefore particularly point out and distinctly claim as my invention:

1. A trestle comprising two elongated angle-form sheet metal members hingedly connected at opposed lengthwise edges, two spaced tubular sheet metal legs integrally connected to each of said members, wooden foot members telescopically inserted in the lower ends of each of said legs, means for locking each of said foot members at desired degrees of extension, sheet metal tray members hingedly attached to the said respective legs of said angle-form members, said tray members being adapted for telescopic movement relative to each other to permit hinged movement of said angle-form members with consequent spacing or approach of said leg members, and means for locking said tray members to hold said legs in spaced relationship.

2. A trestle comprising two elongated angle-form sheet metal members hingedly connected at opposed lengthwise edges, spaced tubular sheet metal legs attached to each of said members, extensible foot members telescopically inserted in each of said foot members at desired degrees of extension, and sheet metal tray members hingedly attached to the said respective legs of said angle-form members, said tray members being disposed for telescopic movement relative to each other to permit hinged movement of said angle-form members with consequent spacing or approach of said leg members.

3. In a trestle as described, the improvement comprising an elongated sheet metal trough-shaped portion hingedly divided along its longitudinal axis, a pair of sheet metal leg members attached to each half of said trough-shaped portion, and means for adjustably spacing said pairs of leg members.

4. In a saw horse as described the improvement comprising a metal trough adapted to receive and support a wood working platform, said trough being split longitudinally into two similar parts united by a hinge and said trough being supported by extensible legs a pair of which are attached to each of said parts with adjustable means for holding one pair of legs spaced from the other pair of legs.

SCOTT J. CROZIER.